(12) United States Patent
Kirchhoff et al.

(10) Patent No.: US 10,277,775 B2
(45) Date of Patent: Apr. 30, 2019

(54) METHOD FOR COMPENSATING FOR TONE VALUE FLUCTUATION IN AN INKJET PRINTING MACHINE

(71) Applicant: HEIDELBERGER DRUCKMASCHINEN AG, Heidelberg (DE)

(72) Inventors: Dirk Kirchhoff, Kiel (DE); Bernd Stritzel, Goosefeld (DE); Michael Kaiser, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/938,033

(22) Filed: Mar. 28, 2018

(65) Prior Publication Data

US 2018/0288277 A1 Oct. 4, 2018

(30) Foreign Application Priority Data

Mar. 31, 2017 (DE) .................. 10 2017 205 505

(51) Int. Cl.
*B41J 2/21* (2006.01)
*H04N 1/52* (2006.01)
(Continued)

(52) U.S. Cl.
CPC .......... *H04N 1/4057* (2013.01); *B41J 2/2132* (2013.01); *B41J 2/2146* (2013.01);
(Continued)

(58) Field of Classification Search
None
See application file for complete search history.

(56) References Cited

U.S. PATENT DOCUMENTS

| 4,303,925 A | 12/1981 | Harbour, Jr. et al. |
| 5,736,993 A | 4/1998 | Regimbal et al. |
| (Continued) | | |

FOREIGN PATENT DOCUMENTS

| DE | 69423271 T2 | 11/2000 |
| DE | 102013107942 A1 | 1/2015 |
| (Continued) | | |

*Primary Examiner* — Anh-Vinh T Nguyen
(74) *Attorney, Agent, or Firm* — Laurence A. Greenberg; Werner H. Stemer; Ralph E. Locher

(57) ABSTRACT

A method for compensating tone value fluctuation in inkjet printing includes generating multi-bit halftone images of pixels on a computer during prepress screening for color separations with multiple tone values out of print image data, forwarding multi-bit halftone images to a control unit of an inkjet printing machine, and printing the multi-bit halftone on the machine, wherein encoded binary values of multi-bit halftone images correspond to ink drop sizes to be generated by the machine. The computer introduces additional binary values of multi-bit halftone images not corresponding to ink drop sizes in pixel positions of multi-bit halftone images where occurring tone value fluctuations are to be compensated for by modified ink drop sizes, causing additional binary values to be ignored by the machine in a regular print mode, and assigning additional binary values to modified ink drop sizes in a correction print mode.

9 Claims, 4 Drawing Sheets

(51) Int. Cl.
*B41J 25/00* (2006.01)
*H04N 1/405* (2006.01)
*H04N 1/407* (2006.01)

(52) U.S. Cl.
CPC ............... *H04N 1/407* (2013.01); *H04N 1/52* (2013.01); *B41J 2025/008* (2013.01)

(56) References Cited

U.S. PATENT DOCUMENTS

| | | | |
|---|---|---|---|
| 5,871,656 A * | 2/1999 | Silverbrook | B41J 2/14451 |
| | | | 216/16 |
| 7,031,021 B1 * | 4/2006 | Lain | H04N 1/52 |
| | | | 358/1.9 |
| 9,875,434 B2 | 1/2018 | Blank et al. | |
| 2005/0134873 A1 | 6/2005 | Kumar et al. | |
| 2008/0261326 A1 | 10/2008 | Dudenhoefer et al. | |
| 2013/0215178 A1 * | 8/2013 | Ueshima | B41J 2/12 |
| | | | 347/14 |
| 2014/0085370 A1 * | 3/2014 | Ishida | B41J 2/2146 |
| | | | 347/14 |
| 2015/0099059 A1 * | 4/2015 | Harjee | B41J 2/07 |
| | | | 427/8 |
| 2015/0298153 A1 * | 10/2015 | Baker | B05B 12/12 |
| | | | 438/7 |
| 2015/0314591 A1 | 11/2015 | De Grijs | |
| 2017/0087910 A1 * | 3/2017 | Nagashima | B41J 2/01 |
| 2017/0217163 A1 * | 8/2017 | Trachanas | B41J 2/04558 |
| 2018/0083230 A1 * | 3/2018 | Harjee | H01L 51/0005 |
| 2018/0099510 A1 * | 4/2018 | Niino | B41J 2/04505 |

FOREIGN PATENT DOCUMENTS

| | | |
|---|---|---|
| DE | 102013214025 A1 | 1/2015 |
| EP | 1732306 A1 | 12/2006 |

\* cited by examiner

METHOD FOR COMPENSATING FOR TONE VALUE FLUCTUATION IN AN INKJET PRINTING MACHINE

CROSS-REFERENCE TO RELATED APPLICATION

This application claims the benefit, under 35 U.S.C. § 119, of German Patent Application DE 10 2017 205 505.7, filed Mar. 31, 2017; the prior application is herewith incorporated by reference in its entirety.

BACKGROUND OF THE INVENTION

Field of the Invention

The invention relates to a method for compensating for tone value fluctuations that occur in an inkjet printing operation.

The technical field of the invention is the field of digital printing.

Printing machines are incapable of providing an immediate 1:1 reproduction of print images to be generated. As a consequence, the existing print images are separated into individual color separations in a so-called preprint process. The color separations correspond to the print colors used in the respective printing machine. The individual color separations are then distributed over a predefined grid in a screening process. For every area in the grid, a decision is made whether or not to set an ink dot in that location. For that purpose, the color separation of the image to be printed is converted to a so-called halftone, which precisely defines in which location such an ink dot is to be placed.

In inkjet printing machines, it is possible to use different ink drop sizes for every dot to create correspondingly different tone values. Since a 1-bit screen is no longer sufficient for the different ink drop sizes at a dot or pixel in the halftone to address the correspondingly different ink drop sizes, so-called multi-bit screens are used in which every pixel in the halftone contains multiple bits. A 2-bit screen, for instance, allows four different ink drop sizes to be addressed.

In the course of a printing operation, tone value fluctuations may occur for technical reasons. Those fluctuations need to be compensated for in a corresponding way. A number of approaches to implement such compensation are known in the art.

One approach is to factor in those determined tone value fluctuations before the screening process in a nozzle-related way when creating the corresponding gray value image of the respective color separation. In that process, gray values are correspondingly increased in locations on the print where a reduced tone value has been detected and gray values are reduced accordingly in locations where increased tone values have been detected in the course of the printing operation. A disadvantage of that process is that due to the fact that the correction is made in a nozzle-related way, the position of the halftone image relative to the printing nozzles of the inkjet head must not be changed. If a change occurs nevertheless, for instance by a register adjustment of the print image, the halftone image is no longer accurately allocated to the nozzles. In that case, the print image needs to be screened again, which means that a register correction incurs long computing times for register correction on the preprint computer, especially if variable data including many different print images are to be printed.

Another approach is to manipulate the halftone image "on the fly" in the printing machine during the printing operation to compensate for occurring tone value fluctuations. The manipulation is achieved by modifying the ink drop sizes in locations where tone value fluctuation occurs. In the course of that halftone image manipulation, new pixels are set, the ink drop size of existing pixels is modified, or pixels are deleted. Such a belated correction of the halftone image is not without its problems, however, because a halftone print image that has already been screened is modified. Moreover, since the printing machine control unit that makes the changes in the existing halftone image does not know how and under which conditions the halftone was generated, the adaptations to the halftone are arbitrary. Such an arbitrary adaptation may result in additional artifacts that have a negative effect on the print image. That is due to the fact that the modified pixels, i.e. the modified ink drop sizes, all but create a new halftone image that is superposed to the actual halftone that has already been created. In that process, visible structures, namely artifacts, that deteriorate the print image are created.

SUMMARY OF THE INVENTION

It is accordingly an object of the invention to provide a method for compensating for tone value fluctuation in an inkjet printing machine, which overcomes the hereinafore-mentioned disadvantages of the heretofore-known methods of this general type and which efficiently compensates for tone value fluctuation in an inkjet printing operation without requiring a recalculation of the halftone image while optimally avoiding the creation of artifacts.

With the foregoing and other objects in view there is provided, in accordance with the invention, a method for compensating for occurring tone value fluctuation in an inkjet printing operation of an inkjet printing machine by using a computer, comprising the steps of generating a multi-bit halftone image of pixels on the computer during a screening operation of the preprint process for every color separation with multiple tone values out of print image data, forwarding the multi-bit halftone image to the control unit of the inkjet printing machine, and printing the multi-bit halftone on the printing machine, wherein every encoded binary value of the multi-bit halftone image corresponds to an ink drop size that may be generated by the inkjet printing machine. The computer is used to introduce additional binary values of the multi-bit halftone image that do not correspond to any ink drop size in pixel positions of the multi-bit halftone image where occurring tone value fluctuations are to be compensated for by modified ink drop sizes, causing these additional binary values to be ignored by the inkjet printing machine in a regular print mode and assigning the additional binary values to the modified ink drop sizes in a correction print mode.

The use of multi-bit screens results in bit values that cannot be assigned to ink drop sizes that may be represented by the printing machine. In the prior art, such corresponding bit values are ignored. The core aspect of the method of the invention is to use these so-far unused bit values to transmit additional information from the raster image processor of the preprint computer to the control unit of the printing machine. This information mainly is formed of the positions in which the existing multi-bit halftone image may be changed by the printing machine control unit to compensate for occurring one value fluctuation without creating artifacts. Then this knowledge is only available at the preprint stage but not on the control unit of the inkjet printing machine. The additional binary values that are set mark the pixels that may be changed by the control unit of the inkjet printing machine. The method of the invention also specifies the way in which the ink drop sizes of the pixels that have been marked in this way may be changed. In the regular printing mode of the inkjet printing machine, the additional binary values are ignored; this means that in the regular printing mode, the control unit of the printing machine will accordingly not set any modified ink drop sizes in this location. However, when a tone value fluctuation occurs, the control unit switches the inkjet printing machine to a correction printing mode in which the control unit sets ink drop size values that have been predefined in a corresponding way in locations where the additional binary values in the multi-bit mode have been set, i.e. a corresponding offset is created. If the offset is 1, for instance, an ink drop size increased by 1 is set in the locations of the additional binary values; if the offset is 2, the ink drop size is increased by 2. The determination as to how much the ink drop size value may be increased is limited by the number of ink drop sizes that the inkjet printing machine is capable of producing. When an ink drop size decrease is desired, the additional binary value in the multi-bit screen in the regular printing mode corresponds to a correspondingly high ink drop size value, whereas in the correction printing mode, the value is reduced in a corresponding way by the predefined offset.

Another preferred development in this context is that the multi-bit halftone image is generated in the screening process using multi-bit masks, each of which corresponds to a corresponding tone value, and the additional binary values are inserted into the multi-bit masks by the computer, causing the additional binary values to be incorporated into the multi-bit halftone in the screening process. One way to generate such a multi-bit halftone image is to pre-calculate a mask for all 256 representable tone values. Every one of these masks is a multi-bit halftone for the corresponding tone value. All of these masks have the same size and are in general much smaller than the actual print image. For instance, they may be 128×128 pixels in size. In order to generate the halftone for an image, the latter needs to be divided into tiles having a size which is the same as the masks. Now for every pixel to be set, the mask that corresponds to the tone value in this location in the image is chosen. The next step is to determine the position relative to its tile. The value that is in the selected mask at this position is now used in the halftone.

A further preferred development in this context is that each one of the additional binary values in the multi-bit halftone image that are necessary for compensating for occurring tone value fluctuation corresponds to an increased or reduced ink drop size. Corresponding ink value fluctuation in the form of tone values that are too low may be compensated for by an increased ink drop size. As explained above, a set additional binary value in the correction printing mode corresponds to an increased ink drop size. If there is tone value fluctuation in terms of tone values that are too high, this is counteracted by a reduced gray scale value due to a reduced ink drop size.

An added preferred development in this context is that when tone value fluctuation with increased ink drop sizes is to be compensated for, the ink drop sizes of pixels of the multi-bit halftone image may only be increased or remain the same. The individual gray scale values of the color separation in the not yet screened image are dependent on one another. Thus, for instance at a gray value distribution from 0 to 255 the rule is that for a gray value 200, for instance, that is to be increased to a gray value of 210, an implementation in the correspondingly screened image is only possible by increasing the ink drop sizes of the pixels in the halftone image or by allowing them to stay the same. Consequently, no pixels may be reduced in terms of their ink drop sizes or even deleted when additional binary values in the multi-bit halftone image are set. If this rule is violated, artifacts will occur.

An additional preferred development in this context is that when tone value fluctuation with decreased ink drop sizes is to be compensated for, the ink drop sizes of pixels of the multi-bit halftone image may only be reduced or stay the same. The aforementioned rule also applies to reduced gray scale values. For instance if a gray value of 210 is to be reduced to a gray value of 200, the ink drop sizes of pixels in the correspondingly later multi-bit halftone image may only be reduced or remain the same. No ink drop size increase may occur for any pixel because this would likewise lead to artifacts.

Another preferred development in this context is that occurring tone value fluctuations are detected by sensors in the inkjet printing machine and are forwarded to the control unit of the inkjet printing machine. The occurrence of tone value fluctuations, which initiate the method of the invention, will be determined in an ongoing printing operation on the printing machine by using sensors. The sensors that are used in this process generally include optical sensors such as digital cameras.

An added preferred development in this context is that the compensation of occurring tone value fluctuations by using the additional binary values in the multi-bit halftone image is carried out by a compensation algorithm on the control unit of the inkjet printing machine. The existing multi-bit halftone image is usually manipulated in the inkjet printing machine by a compensation algorithm on the control unit of the inkjet printing machine. When activated, this compensation algorithm checks the multi-bit halftone image for any additional binary values that have been set and that are not associated with any actual ink drop size. If the algorithm finds any, it will apply a corresponding offset for the ink drop sizes to be set in accordance with its configuration for the additional binary values. The information on the amount of the offset and the question whether it is an increase or a reduction of the ink drop size is provided either by the operator of the inkjet printing machine or directly and automatically from the preprint department computer on which the additional binary values are set.

An additional preferred development in this context is that the multi-bit halftone image is encoded with a 2-bit width and the inkjet printing machine is capable of printing three different ink drop sizes. The inkjet printing machines that are currently most common are usually capable of producing ink drops in three different sizes. Those sizes are no ink drop, a small ink drop, or a large ink drop. In order to be able to represent these three different ink drops in a multi-bit halftone image, 2-bit screens are used. In this process, one bit value remains free to be used for the corresponding additional binary values.

A concomitant preferred development in this context is that the multi-bit halftone image is encoded with a bit width of at least 3 bits and the inkjet printing machine is capable of printing three different ink drop sizes. If 3 bits per pixel are used in the multi-bit halftone image, 5 bit values remain free. This advantageously allows several ways of compensation to be transmitted as information to the inkjet printing machine. For instance, in this way it is possible to reduce or increase the ink drop sizes in different ways such as from 0 to 1, from 0 to 2, and vice versa, for instance. If bit masks are used, it goes without saying that the rules of dependency of the bit masks from one another need to be respected to prevent the creation or artifacts. The same applies to the corresponding screening rules if the multi-bit halftone images are generated directly without any bit masks.

Other features which are considered as characteristic for the invention are set forth in the appended claims.

Although the invention is illustrated and described herein as embodied in a method for compensating for tone value fluctuation in an inkjet printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as such as well as further developments of the invention that are advantageous in strucural and/or functional terms will be described in more detail below with reference to the associated drawings and based on at least one preferred exemplary embodiment.

DETAILED DESCRIPTION OF THE INVENTION

Figure 1:
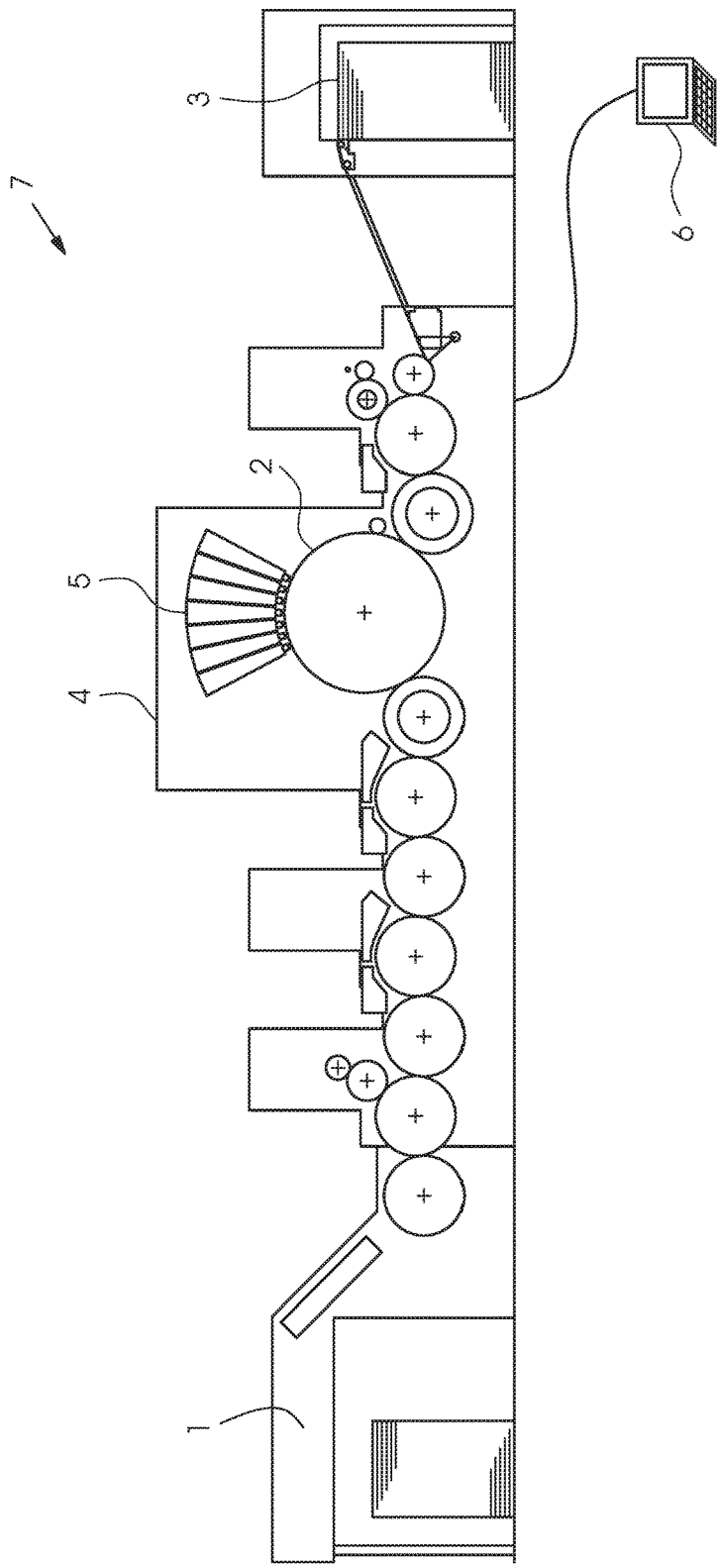
FIG. 1 is a diagrammatic, longitudinal-sectional view illustrating the structure of an inkjet printing machine.

Referring now in detail to the figures of the drawings, in which mutually corresponding elements have the same reference symbols, and first, particularly, to FIG. 1 thereof, it is seen that the field of application of the preferred exemplary embodiment is an inkjet printing machine 7. FIG. 1 shows an example of the fundamental structure of such a machine 7, including a feeder 1 for feeding a printing substrate 2 to a printing unit 4, where it receives an image printed by print heads 5, and a delivery 3. The machine is a sheet-fed inkjet printing machine 7 controlled by a control unit or computer 6.

Pixels may be set or not set on a printing plate for lithographic offset printing. Thus, a simple screening process from 0% to 100% is sufficient. The bitmap only contains on/off information. In contrast, inkjet systems such as the preferred inkjet printing machine 7 may generate drops of different sizes: This is controlled by a bitmap that includes different gray scales i.e. tone values. Every gray scale corresponds to an applied drop size. In a preferred embodiment, these drop sizes which the inkjet printing machine may provide are 0=paper white 10, 1=small drop 8 and 2=large drop 11.

Figure 4:
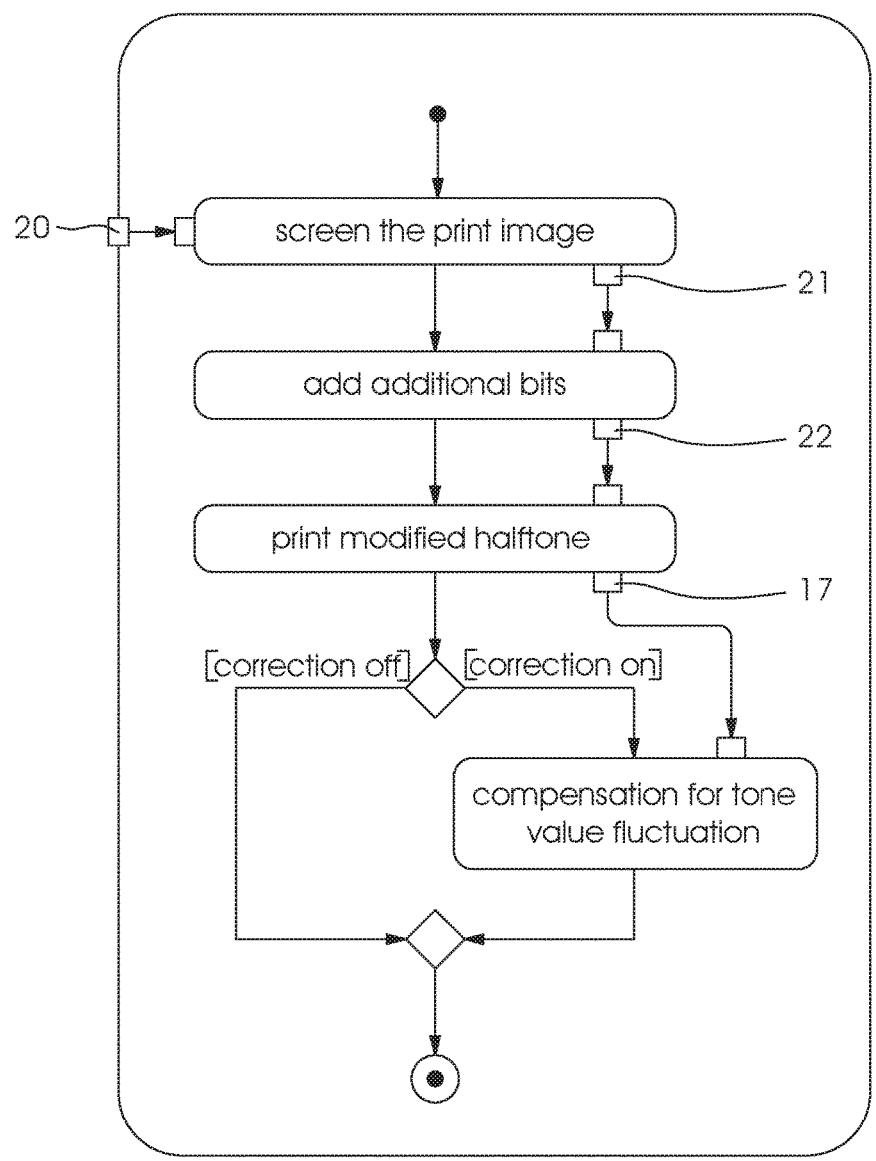
FIG. 4 is a flow chart of the method of the invention.

A flow chart of the preferred exemplary embodiment of the method of the invention is shown in FIG. 4. Having screened a print image 20 into a multi-bit halftone, a preprint computer 23, instead of merely transmitting a halftone 21 to be printed, encodes further information into every pixel 18 that is relevant to the process of compensating for tone value fluctuation. The operator may use these additional data to modify the halftone. This information may for instance include information on how the halftone would look in a darker tone value 12 or lighter tone value 9.

Since the preferred inkjet printing machine 7 is capable of setting drops of two different sizes, the following consequences arise for the method of the invention. The halftone 21 needs to be transmitted in a 2-bit encoded graphic. The value 0 in the multi-bit mask 9, 12 accordingly means that no drop 10 is set (paper white), the value 1 means that a small drop 8 is set, and the value 2 means that a large drop 11 is set.

In addition, a 2-bit is capable of transmitting a value 3 18, which may consequently be used for additional information. For instance, the value 3 18 might have the same meaning as the value 1 8 for the multi-bit screen 21, 22. If the tone value needs to be reduced, the value 3 18 may be interpreted as the small drop sizes, which are preferably to be removed.

Figure 2:
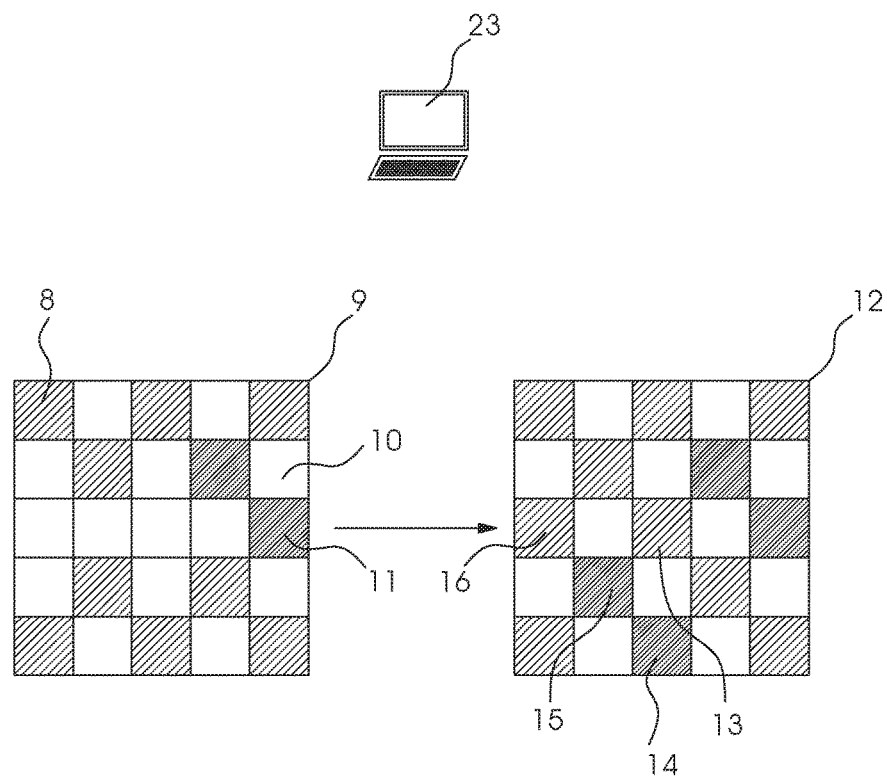
FIG. 2 is a top-plan view of dependent multi-bit masks of different gray scale values along with a computer.

In a screening process based on multi-bit masks 9, 12, it is possible to modify the bit masks 9, 12 to create a halftone 22 that contains additional information on darker tone values 12 or lighter tone values 9. Such a bit mask 9, 12 formed of a 5×5 matrix is shown in FIG. 2. The left bit mask 9 represents a low tone value. The right bit mask 12 represents a slightly higher tone value. The bit masks 9, 12 are dependent on one another, which means that to get from a lower to a higher tone value, pixels 13, 14, 15, 16 may only get darker. In order to get from a high tone value to a lower tone value, the same applies vice versa. Darker pixels in the multi-bit halftone 21, 22 consequently mean larger ink drops in the printing machine 7.

In order to modify a bit mask 9, 12 to a specific tone value, one compares the latter with the bit mask 9, 12 for the desired lighter or darker tone value. Those pixels 8, 10, 11 that differ in this comparison are then encoded into a bit mask 19. In the actual screening process, this additional information is automatically integrated into the multi-bit halftone 22 without any additional effort.

Figure 3:
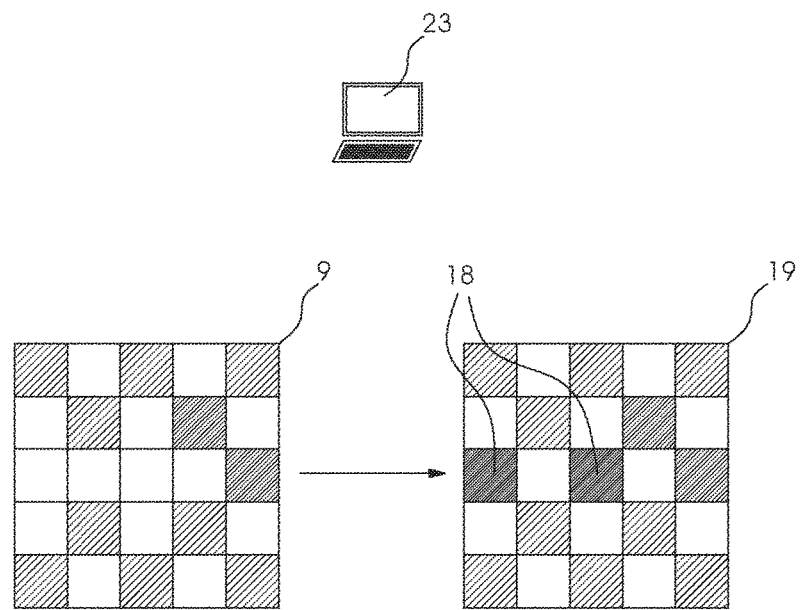
FIG. 3 is a view similar to FIG. 2 of masks having a gray scale value that has been changed due to binary values that have additionally been set.

FIG. 3 illustrates an example of this process on the basis of two multi-bit masks 9, 19. This example likewise uses a screening system with bit masks 9, 19 that are 5×5 pixels in size. The pixels are 2-bit encoded. A white pixel 10 corresponds to the value 0, a light gray pixel 8 corresponds to the value 1, a dark gray pixel 11 corresponds to the value 2 and a black pixel 18 corresponds to the value 3. The original bit masks 9, 12 do not use the value 3 18, which may thus be used for additional information. In this example, the left-hand bit mask 9 of FIG. 3 is modified in accordance with the invention. The additional information is intended to describe a darker tone value to compensate for a tone value fluctuation in the form of a tone value that is too low. The black pixels 18 describe light gray pixels 8 that have been added. This means that the black pixels 18 to which no ink drop size is assigned are interpreted as light gray pixels 8 and are accordingly printed as value 1 ink drops sizes. The result is the modified multi-bit mask 19 shown on the right side of FIG. 3. The preprint computer 23 may then use this modified multi-bit mask 19 in the screening process to create a multi-bit halftone image 22 that also includes the additional value 3 pixels 18. This multi-bit halftone image 22 is then transmitted to the control unit 6 of the inkjet printing machine 7 and printed by the latter. In a regular printing mode, the additional pixels 18 are ignored, i.e. they correspond to the value 0 and are not printed, resulting in the output tone value of the unmodified bit mask 9, 12. However, if tone value fluctuations in the form of a tone value that is too low occur, a correction algorithm is activated. The correction algorithm inserts the value 1 that is printable by the printing machine 7 for all additional existing value 3 pixels 18 present in the multi-bit halftone image 22. This means that by inserting additional value 3 pixels 18, a darker tone value corresponding to the tone value of the modified bit mask 19 is printed in all value 3 locations in the printed multi-bit halftone 17. This means that the tone value fluctuation may be compensated for by the correction algorithm in a targeted way and as defect-free as possible. This is possible because it conforms to the requirements in terms of where and which pixels may be modified since this required information is forwarded to the inkjet printing machine 7 from the raster image processor by using the modified bit masks 19 or the modified multi-bit halftone image 22.

A further preferred exemplary embodiment envisages transmitting 3 bits per pixel in the multi-bit mask. Thus a total of 8 states are available. An inkjet printing machine 7 that is still capable of printing two different drop sizes—resulting in values 0=paper white, 1=small drop, and 2=large drop—would thus have 5 states that are not used. These 5 states may be used to integrate further additional information for different compensation directions into the multi-bit halftone 21.

A potential encoding of the pixels in terms of the bit values in the multi-bit halftone image 22, 17 might look as follows:
0—no drop
1—small drop
2—large drop
3—no drop; is preferably set as a small drop in case of positive compensation
4—small drop; is preferably set as a large drop in case of positive compensation
5—small drop; is preferably set as no drop in case of negative compensation
6—large drop; is preferably set as a small drop in case of negative compensation
7—ignored (=no drop)

An even larger bit width per pixel of 4 bits and more would allow even finer grades to be introduced. For instance, one could distinguish between a strong and a weak compensation. In a weak compensation, only the values marked for this purpose would be used. In a strong compensation, all pixels that have been marked for strong and weak compensation would be used.

The following is a summary list of reference numerals and the corresponding structure used in the above description of the invention. List of Reference Symbols:
1 feeder
2 printing substrate
3 delivery
4 inkjet printing unit
5 inkjet print head
6 control computer of the inkjet printing machine
7 inkjet printing machine
8 pixel in multi-bit mask with bit value 1
9 multi-bit mask with low tone value
10 pixel in multi-bit mask with bit value 0
11 pixel in multi-bit mask with bit value 2
12 multi-bit mask with higher tone value
13, 16 added pixels in multi-bit mask with bit value 1
14, 15 added pixels in multi-bit mask with bit value 2
17 printed multi-bit halftone image with tone value fluctuation
18 added pixels with additional information with bit value 3
19 multi-bit mask with additional information
20 print image data
21 multi-bit halftone image
22 multi-bit halftone image with additional information
23 preprint department computer

The invention claimed is:

1. A method for compensating for occurring tone value fluctuation in an inkjet printing operation of an inkjet printing machine by using a computer, the method comprising the following steps:
generating a multi-bit halftone image of pixels on a computer during a screening process of a preprint process for every color separation with multiple tone values out of print image data;
then forwarding the multi-bit halftone image to a control unit of the inkjet printing machine, and printing the multi-bit halftone on the printing machine, with every encoded binary value of the multi-bit halftone image corresponding to an ink drop size that may be generated by the inkjet printing machine; and
introducing, by using the computer, additional binary values of the multi-bit halftone image not corresponding to any ink drop size in pixel positions of the multi-bit halftone image where occurring tone value fluctuations are to be compensated for by modified ink drop sizes, causing the additional binary values to be ignored by the inkjet printing machine in a regular print mode, and assigning the additional binary values to the modified ink drop sizes in a correction print mode.

2. The method according to claim 1, which further comprises:
generating the multi-bit halftone image in the screening process using multi-bit masks each corresponding to a corresponding tone value; and
inserting the additional binary values into the multi-bit masks by the computer, causing the additional binary values to be incorporated into the multi-bit halftone in the screening process.

3. The method according to claim 1, wherein each one of the additional binary values in the multi-bit halftone image being necessary for compensating for occurring tone value fluctuation, corresponds to an increased or reduced ink drop size.

4. The method according to claim 3, wherein when tone value fluctuation with increased ink drop sizes is to be compensated for, the ink drop sizes of pixels of the multi-bit halftone image may only be increased or remain the same.

5. The method according to claim 4, wherein when tone value fluctuation with decreased ink drop sizes is to be compensated for, the ink drop sizes of pixels of the multi-bit halftone image may only be reduced or remain the same.

6. The method according to claim 1, which further comprises using sensors in the inkjet printing machine to detect occurring tone value fluctuations to be forwarded to the control unit of the inkjet printing machine.

7. The method according to claim 1, which further comprises using a compensation algorithm on the control unit of the inkjet printing machine to carry out the compensation of occurring tone value fluctuations by using the additional binary values in the multi-bit halftone image.

8. The method according to claim 1, which further comprises encoding the multi-bit halftone image with a 2-bit width, and providing the inkjet printing machine with a capability of printing three different ink drop sizes.

9. The method according to claim 1, which further comprises encoding the multi-bit halftone image with a bit width of at least 3, and providing the inkjet printing machine with a capability of printing three different ink drop sizes.

* * * * *